United States Patent [19]

Kawashima

[11] Patent Number: 4,809,354

[45] Date of Patent: Feb. 28, 1989

[54] HYDROSTATIC BEARING UTILIZING A FERROMAGNETIC FLUID

[75] Inventor: Sousuke Kawashima, Maebashi, Japan

[73] Assignee: Nippon Seiko Kabushiki Kaisha, Tokyo, Japan

[21] Appl. No.: 130,985

[22] Filed: Dec. 10, 1987

[30] Foreign Application Priority Data

Dec. 10, 1986 [JP] Japan .................... 61-294262
Dec. 10, 1986 [JP] Japan .................... 61-294263

[51] Int. Cl.⁴ .................... F16C 32/06; F16C 33/74; F04B 17/00; H02K 44/00
[52] U.S. Cl. .................... 384/114; 384/133; 415/10; 417/50; 417/322
[58] Field of Search .................... 384/1, 12, 99, 100, 384/107, 111, 114–116, 118, 119, 121, 124, 133, 446; 417/50, 322; 415/10

[56] References Cited

U.S. PATENT DOCUMENTS

| | | | |
|---|---|---|---|
| 3,439,961 | 4/1969 | Stiles .................... | 384/114 |
| 3,635,532 | 1/1972 | Zerbola . | |
| 3,726,574 | 4/1973 | Tuffias et al. .................... | 384/133 |
| 4,254,961 | 3/1981 | Fersht et al. .................... | 384/100 X |
| 4,432,699 | 2/1984 | Beckman et al. .................... | 417/322 X |
| 4,630,943 | 12/1986 | Stahl et al. .................... | 384/133 |

FOREIGN PATENT DOCUMENTS 2402237 1/1974 Fed. Rep. of Germany .

OTHER PUBLICATIONS

Magazine Article from *Machine Design* dated 3-28-68 entitled "Magnetic-Fluid Seals" by Rosensweig et al.

*Primary Examiner*—Thomas R. Hannon
*Attorney, Agent, or Firm*—Basile and Hanlon

[57] ABSTRACT

A hydrostatic bearing system utilizing ferromagnetic fluid exclusively as working fluid including that used for sealing for preventing the ferromagnetic fluid itself from escaping outside the bearing. In order to accomplish the objects and function, the hydrostatic bearing system proposed here comprises, in addition to ordinary parts or components used in the conventional type, a fluid chamber for containing the ferromagnetic fluid as a working fluid, a circulating passage, at least a recovery groove for collecting the fluid squeezed out of the fluid chamber, a magnetic seal to prevent the fluid from escaping and at least an impelling device to forcibly deliver the ferromagnetic fluid at a predetermined pressure and flow rate. The impelling device can be constructed utilizing a shifting magnetic field, or multilayered rings fabricated of piezo-electric components, or of impelling cylinders having axially lengthened or reduced in length.

6 Claims, 6 Drawing Sheets

HYDROSTATIC BEARING UTILIZING A FERROMAGNETIC FLUID

BACKGROUND OF THE INVENTION

1. Field of the Invention

This invention relates to hydrostatic bearings in which a shaft and the static bearing to be fitted on the shaft are rotatable or slidable relative to one another, and more particularly to a hydrostatic bearing utilizing a ferromagnetic fluid as a working fluid.

2. Description of the Prior Art

There has been proposed a hydrostatic bearing of a conventional type as shown by FIG. 12.

This conventional type bearing comprises a rotary shaft 2 fitted within a hydrostatic bearing 1. The inner face of the hydrostatic bearing 1 is provided with an oil chamber 3 supplied with working oil under a predetermined pressure, annular recovering grooves 4 disposed at both axial ends of the bearing spaced apart at a predetermined distance, and a pair of sealing grooves 5, each of which is also disposed at both axial extremities of the bearing. The oil chamber 3 is supplied with the working oil from an exterior oil pump 7 through a vent port 6. Working oil axially squeezed out from the oil chamber 3 is recovered from the recovering grooves 4 and returned to an oil tank 9 via a vent port 8. The sealing groove 5 is supplied with hydrostatic sealing gas from a pressurized sealing gas source 10 via a pressure regulating valve 11 and a port 12 so that the operating oil squeezed out of the recovery grooves 4 can be prevented from escaping.

U.S. Pat. No. 3,439,961 discloses a bearing entitled "Bifluid Hydrodynamic Bearing" which uses a high pressure gas as a hydrostatic gas and seals the operating high pressure gas by magnetically attracting a ferromagnetic fluid containing fine ferrite particles by means of a magnetizing coil.

However, since the conventional bearing as shown by FIG. 12 is constructed in such a manner that the working oil is prevented from escaping by keeping the pressure balance between the working oil and the sealing fluid, it becomes impossible to shut out the hydrostatic system from the exterior atmosphere. Additionally, another problem is that such air sealing cannot be applied to such facilities for making semiconductors which must be carried out in a vacuum.

It was contemplated to use a mechanical seal in place of an air seal with an intention to obviate such drawbacks, but in this way it was inevitable that some extent of air exists around the sealing means in the oil recovering means as a shock absorbing medium so as to maintain the sealing function of the device when the hydrostatic bearing is started, at the time of load variation and against thermal expansion, and therefore, it is also inevitable that a slight extent of seal gas may be squeezed out.

Moreover, roller bearings instead of hydrostatic bearings have also been used, however, such bearings require grease as a lubricant and the oil contained in the grease may evaporate and thus contaminate the outer atmosphere.

The bearing of U.S. Pat. No. 3,439,961 is constructed to seal the high pressure gas by a ferromagnetic fluid, but because of the high extent of compressibility of the high pressure gas used as a hydrostatic fluid as compared with liquid, it cannot be used since it is not possible for such bearing to supplement high pressure gas during running, so it would not be able to function as a hydrostatic bearing when some extent of high pressure gas has been squeezed out due to long periods of use.

An object of the present invention has been set by taking the problems encountered in the aforesaid prior art bearings into consideration, and it aims to provide a hydrostatic bearing using ferromagnetic fluid which can solve the above-mentioned problems by virtue of utilizing noncompressive ferromagnetic fluid as the working fluid of a hydrostatic bearing and by preventing this ferromagnetic fluid from escaping outside of the bearing.

Another object of the present invention is to provide a hydrostatic bearing utilizing ferromagnetic fluid capable of improving the efficiency of impelling the ferromagnetic fluid by providing suitable impelling means for returning the ferromagnetic fluid to the fluid chamber of the bearing.

SUMMARY OF THE INVENTION

In order to accomplish the aforesaid objects, a first aspect of the present invention is directed to a hydrostatic bearing system which comprises a shaft, a hydrostatic bearing provided with fluid chamber(s) at positions confronting the shaft for hydrostatically holding ferromagnetic fluid, means for sealing at both axial ends of the chamber, and being movable relative to each other. The hydrostatic bearing further comprises recovery grooves disposed at both axial ends of the chamber for collecting ferromagnetic fluid squeezed out from the fluid chamber, magnetic sealing means disposed at the portion from which the ferromagnetic fluid is squeezed out, circulating passages formed for circulating the ferromagnetic fluid between the recovery groove and the fluid chamber and impelling means disposed within the passage for impelling the ferromagnetic fluid toward the fluid chamber.

A second aspect of the present invention is directed to a hydrostatic bearing system which comprises, a shaft and a hydrostatic bearing fitted around said shaft, movable relative to each other, and provided with fluid chamber(s) at positions confronting the shaft for hydrostatically holding ferromagnetic fluid and means for sealing at both axial sides of the chamber. The hydrostatic bearing further comprises recovery grooves for collecting the ferromagnetic fluid squeezed out from the chamber, a circulating passage connecting the recovery grooves and the chamber, impelling means relating axially to the side portion of the recovery groove for impelling the ferromagnetic fluid, and magnetic sealing means disposed at the portion from where the ferromagnetic fluid is squeezed out. The impelling means consists of a flexible membrane which constitutes a side wall of the recovery groove, a plurality of impeller ring members concentrically stacked around the passage and abutted to the outside of the flexible membrane of the recovery groove so as to be actuated axially and reciprocally, and means for changing the flow resistance of the ferromagnetic fluid being located at the end connecting the circulating passage to the recovery groove near the impeller ring.

According to the first aspect of this invention, ferromagnetic fluid at a predetermined pressure is supplied to the fluid chamber defined between the shaft and the bearing. The bearing function is attained by static pressure of the ferromagnetic fluid contained in the fluid chamber. In addition, the ferromagnetic fluid is prevented from escaping outward by virtue of the magnetic seal disposed at the axial ends of the bearing. Since both the circulating passages and the impelling means are disposed within the bearing, the travel length of the magnetic fluid can be made shorter, giving rise to a reduced amount of magnetic fluid required by the bearing system.

With respect to the second aspect of this invention, since the magnetic fluid is supplied at a predetermined pressure by the impelling means to the fluid chamber defined between a guide shaft and the bearing, the bearing function is attained by the static pressure of the ferromagnetic fluid contained in the fluid chamber. In addition, the magnetic fluid is securely prevented from escaping outward by virtue of the magnetic seal disposed at both axial ends of the fluid chamber. Since the impelling means for returning the magnetic fluid to the fluid chamber is disposed adjacent to the recovery grooves, the area of applying pressure by the impelling means can be made larger and thereby improves the efficiency of impelling the fluid.

Explanation will now be made of several preferred embodiments in accordance with the present invention by referring to the accompanying drawings.

DETAILED DESCRIPTION OF THE PREFERRED EMBODIMENTS

Figure 1:
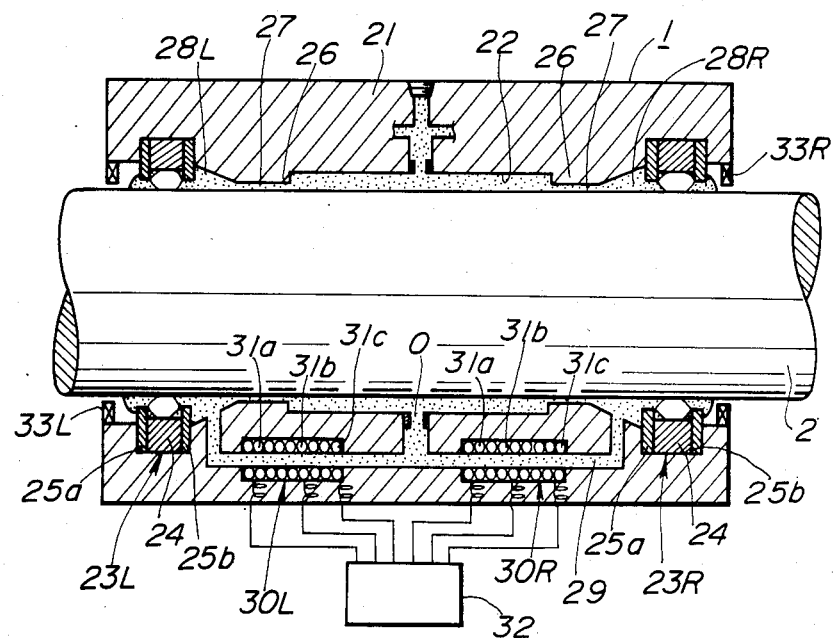
FIG. 1 is a sectional side elevation showing a first embodiment of the present invention.
Figure 2:
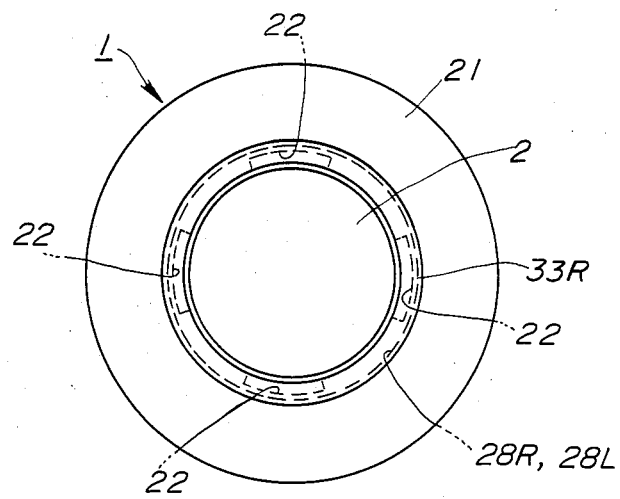
FIG. 2 is a right side front view of FIG. 1.

Both FIG. 1 and FIG. 2 are sectional views showing a first embodiment of the invention.

In the drawings, numeral 1 denotes a hydrostatic bearing, and 2, a rotary shaft rotatably and slidably fitted adjacent to the inner surface of the hydrostatic bearing.

The hydrostatic bearing 1 comprises a cylindrical casing 21 fabricated of nonmagnetic material such as a nonferrous metal, an alloy, or a synthetic resinous material having a diameter slightly larger than the outside diameter of the rotary shaft 2.

At the central portion on the inner surface of the casing 21, there are disposed fluid chambers 22, each formed as a recess in the inner surface of the casing 21, for hydrostatically holding a ferromagnetic fluid as a working fluid. The recesses are formed at four positions on the inner peripheral surface of the casing in such a manner that the chambers are positioned to confront with each other in the x and y direction.

The ferromagnetic fluid to be used for the present invention is a kind of colloidal fluid which has been prepared by stably dispersing fine magnetic particles, such as ferrite, in a carrier in liquidous phase. The ferromagnetic fluid behaves as if the fluid itself has apparent magnetic properties without being susceptible to any sign of coagulation or precipitation under a newtonian field or magnetic field.

Both axial ends on the inner peripheral surface of the casing 21 are provided with magnetic seals 23L and 23R, respectively. Each of the magnetic seals 23L and 23R is composed of an annular permanent magnet 24 magnetized to have N-S poles in the axial direction and a pair of magnetic yokes 25a and 25b, each of which attach to a respective axial end of each magnet 24. In this instance, the inner diameter of the magnetic yokes 25a and 25b are selected to be slightly larger than the outside diameter of the rotary shaft 2, and the ferromagnetic fluid, as described in further detail below, can be magnetically attracted by the magnetic field established between these magnetic yokes 25a and 25b, thereby preventing the magnetic fluid from escaping.

Annular recovery grooves 28L and 28R are formed at the portions between the fluid chamber 22 and each magnetic seal 23L and 23R. The recovery grooves are allowed to communicate with the fluid chamber 22 through a slight clearance defined between lands 26 and the outer face of the rotary shaft 2. Within the casing 21 is provided a circulating passage 29 which communicates with both the recovery grooves 28L and 28R and the fluid chamber 22 through a fixed throttling O.

A pair of impelling means 30L and 30R are disposed around the circulating passage 29 to move the ferromagnetic fluid toward the fluid chamber 22 and thereby maintain the hydrostatic pressure of the ferromagnetic fluid in the fluid chamber 22 at a predetermined level. The impelling means 30L and 30R are composed of three phase exciting coils 31a, 31b, 31c, supplied by circuit 32, which generate a moving magnetic field by successive supplying of electricity of three phase alternative current of preselected frequency attracting the ferromagnetic particles and impelling the attracted particles toward the center of the fluid chamber 22, for example, at a flow rate and a discharge pressure of about 0.06 cc/sec and 5 Kg/cm$^2$ respectively.

In the drawing, numeral 33L and 33R are dust seals disposed outside the respective magnetic seals 23L and 23R for preventing dust from entering from outside.

During operation, when the rotary shaft 2 is in a stationary state, no electric current is supplied from the circuit 32 connected to the impelling means 30L and 30R. As such, no moving magnetic field is created in the impelling means 30L and 30R and the ferromagnetic fluid is stationary so that the hydrostatic pressure within the fluid chamber becomes zero and the rotary shaft 2 contacts, and is supported by, the lands 26 of the hydrostatic bearing 1. Under such condition, the ferromagnetic fluid is distributed throughout the fluid chamber 22, the recovery grooves 28L and 28R, and the circulating passage 29, and due to the magnetic seals 23L and 23R, leakage or escaping of the ferromagnetic fluid outwards of the bearing is prevented by the fact that the ferromagnetic fluid is attracted by the magnetic force exerted by said magnetic seals.

When it is required to hydrostatically support the rotary shaft 2 during rotation, the actuating circuit 32 is started so as to supply electric current to the exciting coils 31a, 31b, 31c connected to the impelling means 30L and 30R to create a shifting magnetic field directed towards the central part of the fluid chamber 22. The magnetic field acts to impel the ferromagnetic fluid toward the fluid chamber 22, and as such, the ferromagnetic fluid in the fluid channel 22 is kept at a predetermined pressure.

Upon pressurization of the ferromagnetic fluid, as mentioned above, a thin film of ferromagnetic fluid is formed within a bearing cavity defined between the inner face of the hydrostatic bearing 1 and the outer peripheral face of the rotary shaft 2, resulting in a uniform clearance in the radial direction. This allows the rotary shaft 2 to float in the bearing cavity of the hydrostatic bearing 1 ensuring smooth rotation of the shaft.

The ferromagnetic fluid squeezed out of the fluid chamber 22 is collected by the recovery grooves 28L and 28R and then returned to the impelling means 30L and 30R via the circulating passage 29. Any ferromagnetic fluid squeezed further outside the recovery grooves 28L and 28R is prevented from escaping by means of the magnetic seals 23L and 23R, thereby preventing the exterior atmosphere from contamination as well as assuring remarkable reduction in the loss of ferromagnetic fluid in use.

Furthermore, since both the circulating passages and the impelling means are disposed within the casing 21, it is rendered possible to reduce the overall length of the circulating passage 29, giving rise to a reduction in the amount of expensive ferrofluid required as a working fluid resulting in reduced production costs.

Although the first embodiment is explained with respect to a bearing for supporting a rotary shaft having a circular cylindrical outer face, it is also possible for this invention to be applied to other bearing types which are applied to a fixed shaft in place of the rotary shaft upon which the hydrostatic bearing 1 is slidably moved in an axial direction; namely, a so-called slider.

A second embodiment of the present invention will be described with reference to FIG. 3. When the fixed shaft 34 is of the type having a square cross sectional shape, the central opening of the casing 1 is also made to be square in cross section. The inner faces of said casing confronting each face of the stationary shaft 34 are formed to have independent fluid chambers 22a, 22b, 22c, 22d. Lands 35a, 35b, 35c, 35d are formed alongside the fluid chambers 35a to 35d, respectively, and recovery grooves 36a, 36b, 36c, 36d are formed correspondingly so that the ferrofluid collected by the recovery grooves can be circulated toward the fluid chambers 22a through 22d by means of the independent impelling means 37a, 37b, 37c, 37d via circulating passages 0.

Figure 3:
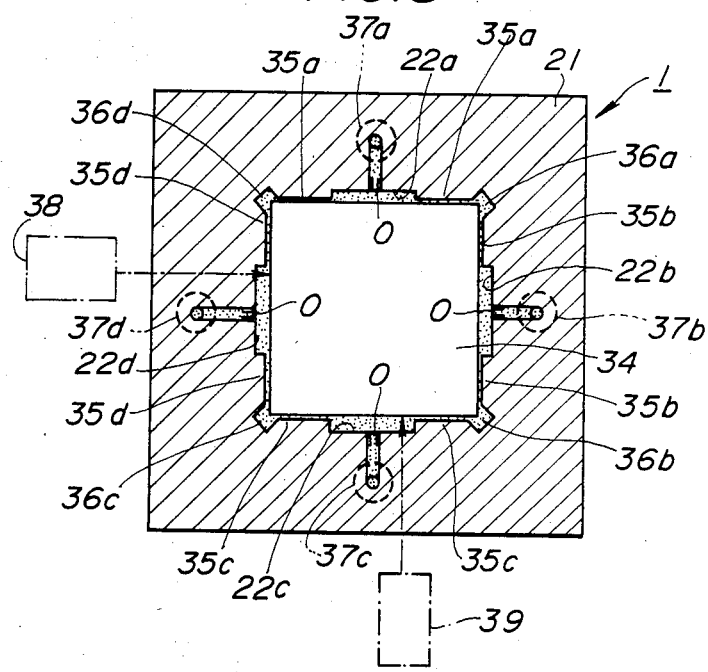
FIG. 3 is a sectional side elevation showing a second embodiment of the present invention.

The relative displacement in both x and y directions between the hydrostatic bearing 1 and the fixed shaft 34 in a plane perpendicular to the axis is detected, respectively, by displacement detectors 38 and 39 as shown schematically in FIG. 3. As a result, the amount of ferromagnetic fluid to be delivered is adjusted in accordance with the detected value by respective impelling means 37a through 37d. As such, the hydrostatic bearing 1 can be floatingly supported with the clearance between the outer surface of the fixed shaft 34 and the inner surface of the hydrostatic bearing 1 kept uniform.

The above embodiments were explained with respect to the applications, where the hydrostatic bearing 1 is fitted around the rotary shaft 1 or the fixed shaft 34, however, it is similarly practicable that a cylindrical hydrostatic bearing is fitted around a fixed shaft.

A third embodiment of the present invention will be described with reference to FIGS. 4 and 5.

In this embodiment a hydrostatic bearing is applied as a radial and thrust bearing to a rotary shaft composed of a tapered portion 2a, the outer diameter of the peripheral surface of which becomes larger toward its downward portion, and a flat portion 2b, which intersects the tapered portion 2b at a right angle to the axial direction of the shaft. The hydrostatic bearing 1 comprises a radial bearing portion 1a for receiving tapered portion 2a and a thrust bearing portion 1b for receiving the flat portion 2b.

The radial bearing portion 1a comprises a cylindrical casing body 42 comprising a cylindrical inner face 41a, adjacent to the cylindrical outer face of the rotary shaft 2, and a tapered inner face 41b, contiguously formed with the cylindrical face 41a and adjacent to the tapered portion 2a of the rotary shaft 2. The top or outer end portion in the cylindrical inner face 41a is provided with a dust seal 43 and a magnetic seal 44. The tapered inner face 41b is provided with fluid chambers 45 and 46 each being disposed at four equally spaced apart portions in the circumference and being aligned in two arrays in the axial direction. Annular recovery grooves 47 and 48 are disposed between the fluid chamber 45 and magnetic seal 44 and between the fluid chambers 45 and 46, respectively. Moreover, there are provided recovery grooves 50 each being disposed via a land 49. The interior of the casing body 42 is provided with a supply passage 51 and a recovery passage 52. One end of the supply passage 51 communicates with the axially central portion of each fluid chamber 45 and 46 through fixed restriction $O_1$ and the other end opens at the lower end face of the cylindrical casing body 42. One end of recovery passage 52 communciates with the recovery grooves 47, 48 and 50 and the other end opens at the lower end face of the cylindrical casing body 42.

The thrust bearing portion 1b is composed of a circular casing body 53 which is fitted to the lower end face of the bearing portion 1a in a fluid tight manner. At its central part, adjacent to the flat end face 2b of the rotary shaft 2, a fluid chamber 54 is formed as a circular recess, and there is also formed an annular recovery groove 55 located adjacent to the peripheral end portion of the rotary shaft 2. The casing body 53 is also provided with a supply passage 56, one end of which communicates with the fluid chamber 54 via the fixed orifice $O_2$ and a recovery passage 57, one end of which communicates with the recovery passage 55. In addition, the supply passage 56 communicates with the supply passage 51 of the radial bearing portion 1a, while the recovery passage 57 and the recovery passage 52 communicate with each other. The other ends of both the supply passage 56 and the recovery passages 57 communicate with each other so as to constitute a circulating circuit.

At the halfway point, or thereabout, of the circulating circuit, there is interposed an impelling means 30 having a construction the same as that of the aforesaid impelling means 30L and 30R which constitute a travelling magnetic field.

During operation, the hydrostatic pressure of the ferromagnetic fluid in the fluid chambers 45, 46 and 54 can be maintained at a predetermined level by impelling, by means of the impelling device 30, the ferromagnetic fluid toward the fluid chambers 45 and 46 of the radial bearing portion 1a as well as the fluid chamber 54 in the thrust bearing 1b. As a result, the rotary shaft 2 is floatingly supported by the hydrostatic bearing 1 by means of the aforesaid hydrostatic pressure. The radial force is received by the hydrostatic pressure given by the fluid chambers 45 and 46 and the thrust force is received by that given by the fluid chamber 54.

The ferromagnetic fluid squeezed out from each fluid chamber 45, 46 and 54 is collected in the recovery grooves 47, 48, 50 and 55, and the thus collected ferromagnetic fluid is moved through the recovery passages 52 and 57 by means of the impelling device 30 and further delivered to each fluid chamber 45, 46 and 54 through the supply passages 51 and 56.

Since a magnetic seal 44 is provided at the upper end of the radial bearing portion 1a, the ferromagnetic fluid is magnetically attracted by the magnetic force imparted by said seal 44, thereby preventing leakage of the ferromagnetic fluid outside the bearing system. In addition, since the radial bearing portion 1a and the thrust bearing portion 1b are fitted in a fluid tight configuration with each other, leakage of ferromagnetic fluid through the gap between the two mating bearing portions is prevented.

Figure 4:
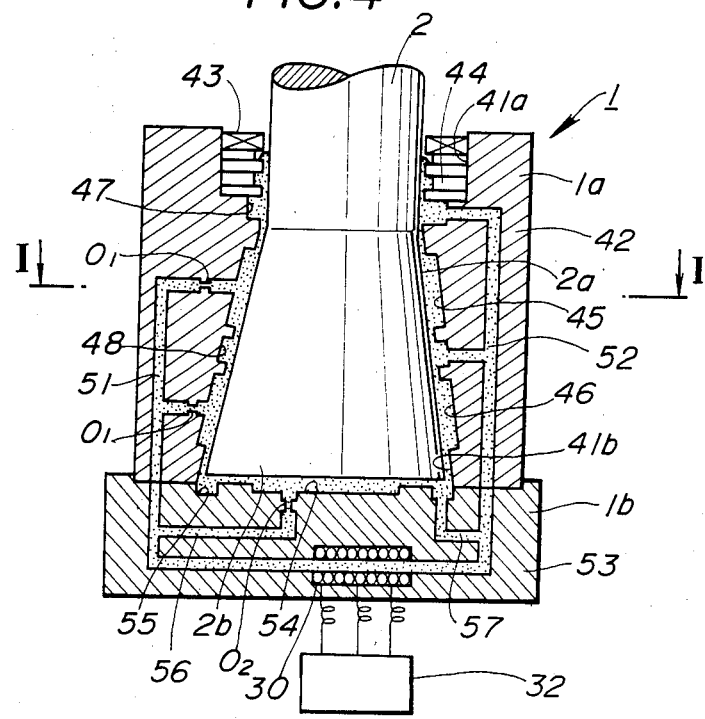
FIG. 4 is a sectional side elevation showing a third embodiment of the present invention.
Figure 5:
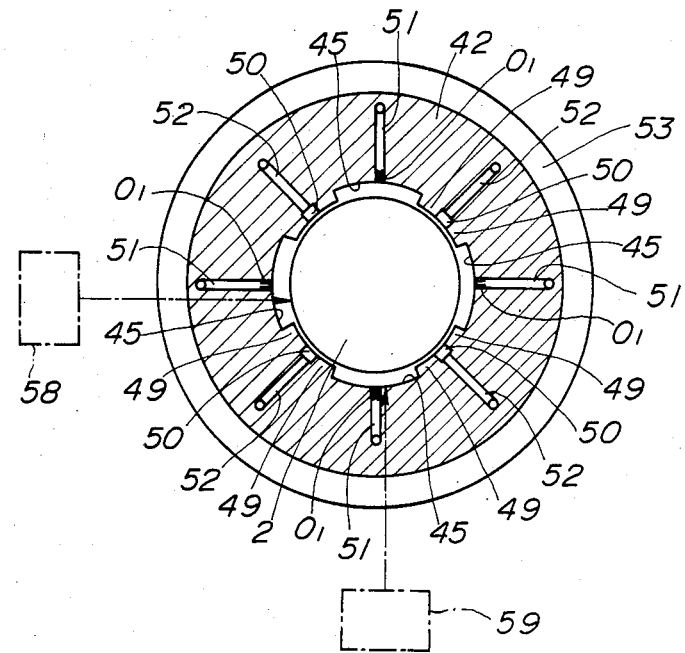
FIG. 5 is a transverse plan view taken along line I—I of FIG. 4.

By virtue of the construction of the third embodiment shown by FIGS. 4 and 5, since the axial end of the rotary shaft 2 is formed with a tapered shape, and correspondingly the radial bearing portion 1a of the hydrostatic bearing 1 is formed to have a tapered inner face, each of the bearing members is pre-pressurized to raise the stiffness as a hydrostatic bearing and thereby enables the rotary shaft to be floated without fail.

The clearance between the hydrostatic bearing 1 and the rotary shaft 2 may be uniformly maintained by controlling the force of the impelling means 30 based on the value of displacement in the x and y directions in the plane perpendicular to the lengthwise axis of the rotary shaft 2. Although in the foregoing explanation on the fluid chambers in the embodiments 1 through 3, two opposing recesses in both the x and y directions were referred to, it is not required to be restricted to such disposition, but any other suitable arrangement, such as composed of three opposing fluid chambers or more, may be optionally selected.

Figure 6:
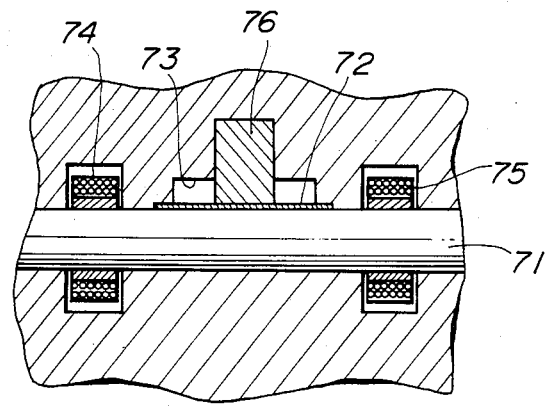
FIGS. 6 through 8 are side elevations, respectively, showing other modifications of the impelling means applicable to the present invention.

Although the explanation on the first through the third embodiment has been made with respect to the impelling means 30 forming a shifting magnetic field 30, such is not required. Means comprising a fluid pump can be made in such a manner as shown in FIG. 6 comprising a cylindrical chamber 73 having a flexible diaphragm 72 formed as a part of the circulating passage 71, magnets 74 and 75 disposed before and after the cylinder chamber 73 for changing resistance to the travel of the ferromagnetic fluid so as to raise apparent viscosity of the fluid, and an actuating means 76 such as a piezo-electric element or an electromagnetic solenoid or the like which is vibrated up and down in a predetermined cycle. During operation the magnets 74 and 75 are ON-OFF controlled in synchronization with the vibration of actuating means 76 so that magnet 74 is kept OFF while magnet 75 is ON thereby attracting the ferromagnetic fluid collected in the recovery groove and passing through the circulating passage. Subsequently, magnet 74 is switched ON and magnet 75 OFF as actuating means 76 is extended to depress the diaphragm 72. As a result, the apparent viscosity of the ferrofluid at the side of magnet 74 becomes high and that at the side of the magnet 75 becomes low, and thus the flow of the ferromagnetic fluid during the time of pressure rise caused by the depression on the diaphragm 72 is toward the magnet 75 because the resistance to flow is higher at the side of the magnet 74 than that at the side of magnet 75. Such a fluid pump that impels the ferromagnetic fluid within the cylinder chamber 73 toward the fluid chamber can also be utilized.

In this case, by selecting the impelling frequency of the diaphragm 72, actuated by the impelling means 76, for 300 Hz and assuming that the surface area of the diaphragm 72 is 2 $cm^2$, the diaphragm can display a flow rate of 0.06 cc/sec and a discharge pressure of 5 $Kg/cm^2$.

Alternatively, the diaphragm 72 and the cylinder chamber 73 can be dispensed with and a part of the circulating passage 71 is composed of a flexible tube to which an impelling member such as a piezo-electric element is engaged with or pressed on.

Figure 7:
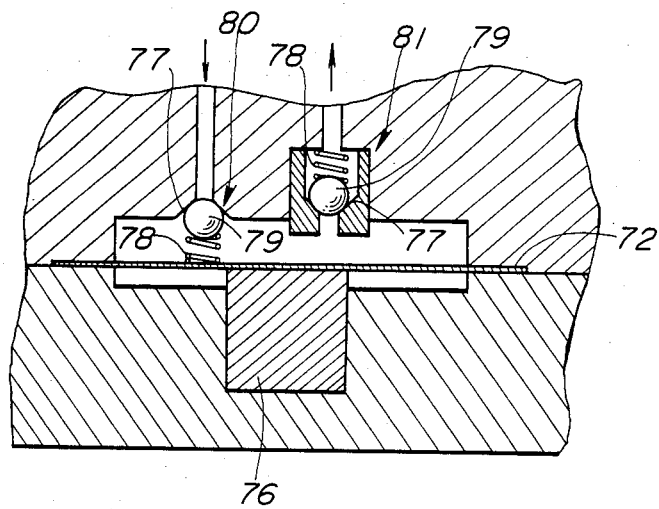

Alternatively, as shown in FIG. 7, a set of check valves 80 and 81, each having a valve seat 77 with a ball 79 urged against the valve seat by a spring 78 can be used instead of the magnets 74 and 75.

Figure 8:
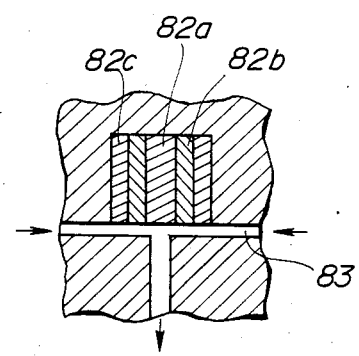

Alternatively, as shown by FIG. 8, the impelling means can be constructed in such a manner that three ringular shaped impelling members 82a, 82b, 82c, made of piezo-electric elements, are concentrically stacked one after another, and are disposed at the branch point of the circulating passage 83. Each impelling member is lowered successively, from the state as shown in FIG. 8, so that the outermost impelling member 82c is lowered first, then the intermediate member 82b, and finally the innermost member 82a, and thus these three members may constitute an impelling pump to deliver the ferromagnetic fluid in the system toward the fluid chamber 22.

Alternatively, the impelling means can be constructed by winding a magnetic coil or coils around the circulating passage. Exciting current is applied to the coils so as to generate magnetic flux directed toward the fluid chamber thereby impelling the ferromagnetic fluid. In short, the impelling means has only to be constructed to be capable of impelling or delivering the ferromagnetic fluid with pressure toward the fluid chamber.

In addition, the casing 21 or 42 is not limited to be formed as a cylindrical configuration, but may be made to have a partly cut ringular cross section. In such a case, magnetic seals are to be formed not only on both axial ends, but also on the circumferential ends of the cut portion.

Figure 9:
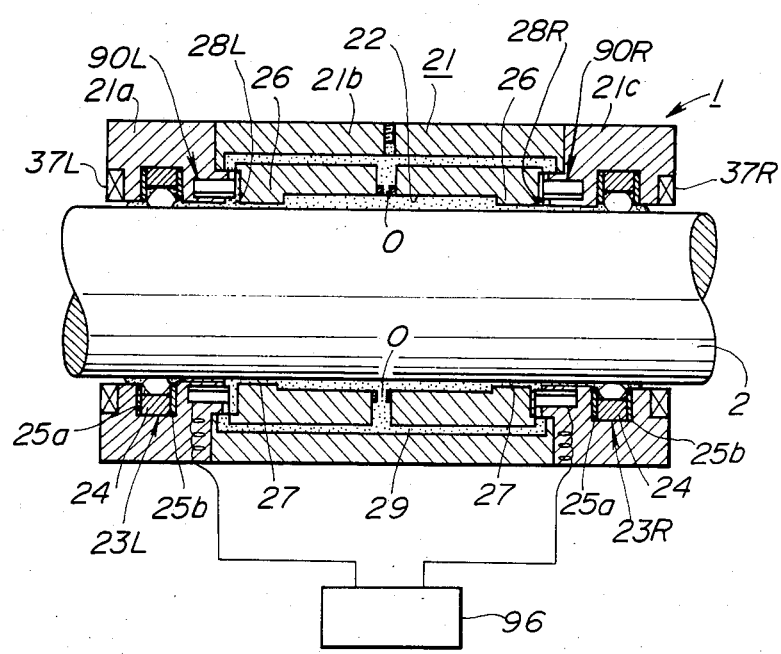
FIG. 9 is a sectional side elevation showing a fourth embodiment of the present invention.

A fourth embodiment of the present invention will be described with reference to FIG. 9.

The hydrostatic bearing 1 comprises a cylindrical casing 21 fabricated of a nonmagnetic material similar to that shown in FIG. 1 of the aforesaid first embodiment.

The casing 21 is axially divided into three sections 21a, 21b, 21c which are joined together in a fluid tight manner.

At the central portion on the inner surface of section 21b, there are disposed fluid chambers 22, for hydrostatically holding a ferromagnetic fluid as a working fluid, at four places on the inner peripheral surface of the casing in such a manner that the two pairs are positioned to oppose each other in the x or y direction.

The ferromagnetic fluid to be used for the present invention is a colloidal fluid such as having been prepared by stably dispersing fine magnetic particles such as ferrite in a carrier in liquidous phase, so that the ferromagnetic fluid behaves as if the fluid itself has apparent magnetic properties without being susceptible to any sign of coagulation or precipitation under a newtonian field or magnetic field.

The outermost axial ends on the inner peripheral surface of sections 21a or 21c, at which ferromagnetic fluid is squeezed out, are provided with magnetic seals 23L and 23R, respectively. Each of these magnetic seals 23L and 23R is composed of an annular permanent magnet 24 magnetized to have N-S poles in the axial direction, and a pair of magnetic yokes 25a and 25b each of which is attached to a respective axial end of each magnet 24. In this instance, the inner diameter of the magnetic yokes 25a and 25b are selected to be slightly larger than the outside diameter of the rotary shaft 2. The ferromagnetic fluid, as explained later, can be magnetically attracted by the magnetic field established between these magnetic yokes 25a and 25b, thereby preventing the magnetic fluid from escaping outwards.

Annular recovery grooves 28L and 28R are formed at positions on the inner periphery of the casing 21 between the fluid chamber 22 and each magnetic seal 23L and 23R. The recovery grooves communicate with the fluid chamber 22 through a slight clearance 27 defined between lands 26 and the outer face of the rotary shaft 2. The casing 21 is provided with a circulating passage 29 which connects the recovery grooves 28L and 28R with the fluid chamber 22 through a fixed restriction O. A pair of impelling means 90L and 90R are disposed within the recovery grooves 28L and 28R adjacent to the axially outer part thereof, so as to impel the ferromagnetic fluid toward the fluid chamber 22 thereby maintaining the hydrostatic pressure of the ferromagnetic fluid in the fluid chamber 22 at a predetermined level.

Figure 10:
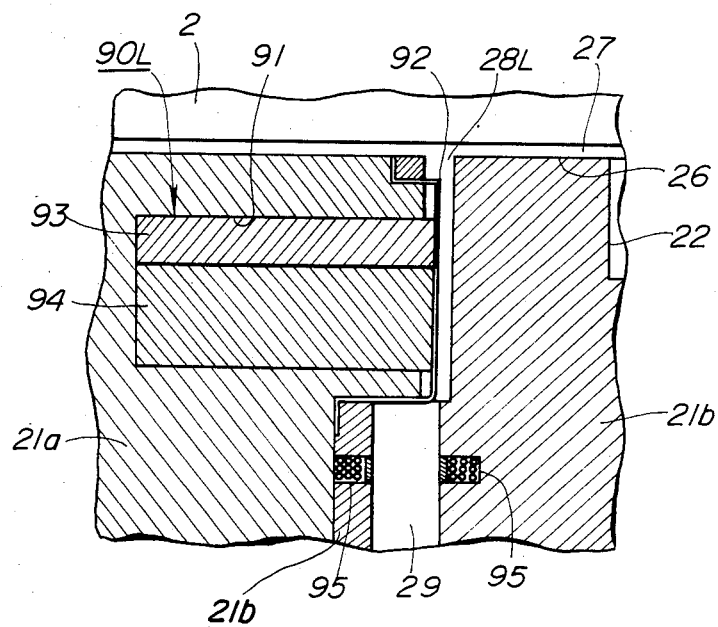
FIG. 10 is an enlarged sectional plan view showing one example of an impelling means applicable to the fourth embodiment of the present invention.

As shown in enlarged scale in FIG. 10, each of the impelling means 90L and 90R is provided, at a position adjacent to the recovery groove 28L and 28R, within an annular recess 91 concentric with the rotary shaft 2. Fixedly attached to said impelling means is a flexible membrane 92, such as a diaphragm, by which the recess 91 and the recovery groove 28L or 28R are isolated from each other.

Two impelling cylinders 93 and 94, composed of piezo-electric elements, are disposed within the annular recess 91, being radially stacked and axially compressible. There is further provided, at the side close to the circulating passage 29 apart from the annular recess 91, a magnet 95 which operates as a means for resistance variation for preventing counterflow of the ferromagnetic fluid from occurring. Each impelling cylinder 93 and 94 is supplied with electric current of a pre-selected cycle and in a pre-selected order by means of an actuating circuit 96 disposed outside the casing 21. When actuated, the axial length of the impelling cylinders 93 and 94 are enlarged or shortened, and the magnet 95 is also energized and actuated by the actuating circuit 96 synchronously with the supply of electric current to the impelling cylinders 93 and 94.

At the beginning of an operating cycle of the impelling means 90L and 90R, each cylinder 93 and 94 is not supplied with electric current and their innermost ends project slightly beyond the opened end of the annular recess 91. The volume of the recovery grooves 28L and 28R is large as the inflow of ferromagnetic fluid from the circulating passage side 29 is restrained by increasing the apparent viscosity of the ferromagnetic fluid by magnetizing the magnet 95 and thereby changing the resistance to travel of the ferromagnetic fluid at the position where the magnet is disposed. Then, as the ferromagnetic fluid is squeezed out from the fluid chamber 22 through the clearance defined between the land 26 and the outer peripheral face of the rotary shaft 2, it is recovered inside the recovery grooves 28L and 28R, thus increasing said volume of fluid within the grooves. Electric current is supplied through the actuating circuit 96, to the inner cylinder 93 to elongate it and let it contact the confronting wall of casing 21b to confine the ferromagnetic fluid. Electric current is subsequently supplied to the outer cylinder 94 forcing it to contact the wall of the casing 21b in a manner similar to cylinder 93 and at the same time, the power supply to the magnet 95 is cut off by means of the actuating circuit 96, thus reducing the resistance to travel of the ferromagnetic fluid through circulating passage 29.

When the rotary shaft 2 is in a stationary state and no electric current is supplied from the actuating circuit 96 to the actuating cylinders 93, 94 and the magnet 95 of the impelling means 90L and 90R, then the cylinders 93 and 94 of the impelling means are in a contracted state and, accordingly, hydrostatic pressure of the ferromagnetic fluid in the fluid chamber is zero. As such, the rotary shaft 2 contacts, and is supported by, the lands 26 of the hydrostatic bearing 1. Under such condition, the ferromagnetic fluid is distributed throughout the fluid chamber 22, recovery grooves 28L and 28R and the circulating passage 29, and since there are disposed the magnetic seals 23L and 23R, leakage or escaping of the ferromagnetic fluid from the bearing is prevented by the fact that the ferromagnetic fluid, otherwise liable to be squeezed out, is attracted by the magnetic force exerted by the aforesaid magnetic seals.

When it is required to hydrostatically support the rotary shaft 2 for its rotation, the actuating circuit 96 is stared and the magnet 95 is excited by electric current. As a result of excitation of magnet 95, the apparent viscosity of ferromagnetic fluid adjacent the magnet 95 becomes high, which, in turn, restrains inflow of ferromagnetic fluid from the circulating passage 29 to the recovery grooves 28L and 28R. Concurrent with or slightly after supplying current to magnet 95, electric current is supplied from the actuating circuit 96 to cylinder 93, so it is elongated and its inner end contacts the wall of casing 21b, thereby confining the ferromagnetic fluid within the space between the magnet 95 and the cylinder 93.

Next, the electric current, having been supplied to the magnet 95 from the actuating circuit 96, is cut off. The apparent viscosity of the ferromagnetic fluid contained in the space between the recovery grooves 28L and 28R is lowered and the ferromagnetic fluid flows readily outward through the circulating passage 29.

Concurrent with or slightly later than this, electric current is supplied from the actuating circuit to the cylinder 94, which is elongated. Accompanying this elongation, the ferromagnetic fluid which has been confined between the magnet 95 and the cylinder 93 is impelled toward the circulating passage 29 and is further delivered to the fluid chamber 22 through passage 29 and the fixed orifice O. Consequently, the hydrostatic pressure of the ferromagnetic fluid within the fluid chamber 22 increases dependent upon the difference between the amount of ferrofluid being impelled and that squeezed out through the space between the land 26 and the rotary shaft 2. As such, the ferromagnetic fluid in the fluid chamber can be maintained at a predetermined level by repeatedly impelling the ferromagnetic fluid through the impelling means 90L and 90R.

When the ferromagnetic fluid in the fluid chamber 22 is kept at a predetermined constant level, the rotary shaft 2 is floated upward away from the land of the hydrostatic bearing 1. Subsequent rotation of the rotary shaft under this condition is made very smoothly, by virtue of the greatly reduced frictional resistance between the rotary shaft 2 and the hydrostatic bearing 1.

The ferromagnetic fluid axially squeezed out from the fluid chamber 22 is collected by the recovery grooves 28L and 28R, returned to the impelling means 90L and 90R, and is forcibly circulated via the circulating passage 29. The ferromagnetic fluid squeezed further outside the recovery grooves 28L and 28R is prevented from escaping outside the casing 21 by means of the magnetic seals 23L and 23R. This prevents the exterior atmosphere from contamination as well as assuring remarkable reduction in the loss of ferromagnetic fluid in use.

Furthermore, since both the circulating passages and the impelling means are disposed within the casing 21, it is rendered possible to reduce the overall length of the circulating passage, giving rise to a reduction in the amount of expensive ferrofluid required as a working fluid, resulting in reduced production costs.

Although the fourth embodiment has been explained with respect to a bearing for supporting a rotary shaft having a circular cylindrical outer face, it is also possible for this invention to be applied to other types of bearings, such as may be applied to a fixed shaft, in place of the rotary shaft, to which the hydrostatic bearing 1 is slidably moved in an axial direction; namely, a so-called slider.

Also, in the fourth embodiment described above, the hydrostatic bearing 1 is fitted around the rotary shaft 2. It is, however, similarly possible to apply the hydrostatic bearing inside a hollow cylindrical rotary shaft.

Alternatively, in the fourth embodiment mentioned above impelling means 90L and 90R were described as composed of two impelling cylinders 93 and 94 made of piezo-electric elements radially stacked together but, they may be composed of impelling cylinders composed of three layers or more and may be actuated successively. In addition, the impelling cylinder is not required to be made of a piezo-electric element, but some other actuating means of a non-compressive type which may be controllably advanced or retracted by some discrete actuating means such as an electromagnetic solenoid may be used.

Figure 11:
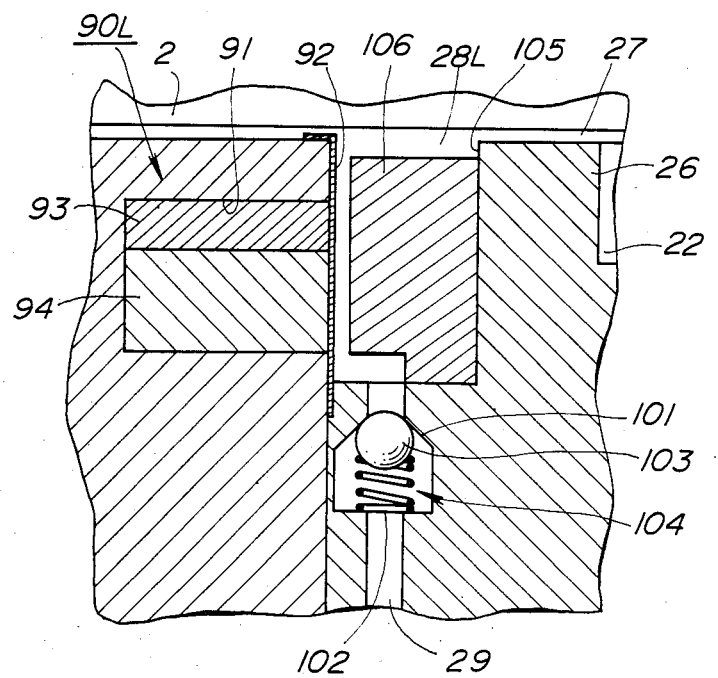
FIG. 11 is an enlarged sectional view showing another example of the impelling means.
Figure 12:
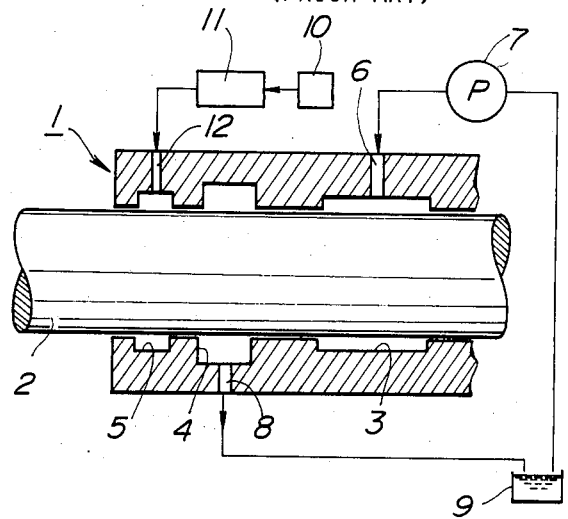
FIG. 12 is a sectional side view showing a prior art bearing.

Furthermore, flow resistance variation means to be used for this invention, for restraining inflow of ferromagnetic fluid into the recovery grooves 28L and 28R, is not limited to a magnet or magnets, but may be replaced by a check valve 104, shown in FIG. 11, which is composed of a ball 103 urged by a spring 102 so as to contact the valve seat 101.

Furthermore, the piezo-electric elements 93 and 94 of the impelling means 90L and 90R are not required to be so limited that each of their end faces confronts directly with the side wall forming each of recovery grooves 28L and 28R. The impelling means can be constructed, as shown in FIG. 11, such that an intermediate seat 106 is disposed within an annular recess 105 forming a recovery groove so that the end face of the intermediate seat can contact the end face of the piezo-electric element 93 or 94.

In addition, the casing 21 is not limited to a cylinder, but can be formed as a channel or groove by axially cutting away a part of the cylinder forming a U-shaped cross-sectional configuration. In such case, the magnetic seal to be applied to this kind of casing shall be applied not only on the axial ends, but also to the peripheral end or ends of the cut-away opening to prevent ferromagnetic fluid from escaping.

As explained heretofore, according to the first embodiment of the present invention, ferromagnetic fluid is utilized as a fluid for generating hydrostatic pressure for floating a hydrostatic bearing relative to a shaft, and the subject fluid is impelled to a fluid chamber or chambers formed on the face of the bearing adjacent the shaft thereby floatingly supporting the shaft. In addition, a magnetic seal is disposed at the position where the ferromagnetic fluid is likely to escape.

The bearing system of this invention prevents the ferromagnetic fluid from escaping without any use of working gas by virtue of the magnetic seal. Such a configuration eliminates the possibility of entrapping gas in the fluid as well as contamination of the exterior atmosphere caused by the leakage of ferromagnetic fluid used in the bearing system, allowing its use in a vacuum environment with no trouble. Moreover, since the bearing system incorporates at least a passage and means for impelling the ferromagnetic fluid within the bearing itself, it has been rendered possible for this bearing system to reduce the volume of the entire fluid system and also to simplify and reduce the size of the entire device, thus minimizing the amount of expensive ferromagnetic fluid used as a working fluid.

According to the second embodiment of the present invention, ferromagnetic fluid is utilized as a fluid for generating hydrostatic pressure for floating a hydrostatic bearing relative to a shaft. The subject fluid is impelled to a fluid chamber or chambers formed on the face of the bearing adjacent to the shaft and thereby a thin film of ferromagnetic fluid is interposed between the shaft and the hydrostatic bearing, allowing relative movement between the two members to be effected very smoothly. In addition, since impelling means have been disposed confronting with the recovery grooves for collecting the escaping ferromagnetic fluid, the area for pressurizing the ferromagnetic fluid can be made large, and thereby the amount of the impelled fluid, as well as the delivery pressure can be increased, as required. Moreover, at least one magnetic seal is disposed at the positions where the ferromagnetic fluid is likely to escape from the bearing system of this invention to prevent the ferromagnetic fluid from escaping outside without any use of working gas by virtue of the magnetic seal. As such, there arises no fear of entrapping exterior gas into the fluid as well as contamination of exterior atmosphere caused by the leakage of ferromagnetic fluid used in the bearing system, allowing its use in a vacuum environment with no trouble.

While certain embodiments of the invention have been described in detail above in relation to a hydrostatic bearing utilizing a ferromagnetic fluid, it will be apparent to those skilled in the art that the disclosed embodiment may be modified. Therefore, the foregoing description is to be considered exemplary rather than limiting, and the true scope of the invention is that defined in the following claims.

What is claimed is:

1. A hydrostatic bearing system comprising:
   a shaft;
   a hydrostatic bearing provided with fluid chambers at positions confronting the shaft for hydrostatically holding ferromagnetic fluid;
   sealing means at the axial sides of said chambers configured to allow movement between said hydrostatic bearing, and said shaft;
   recovery grooves disposed at the axial sides of said chambers for collecting the ferromagnetic fluid squeezed out from the fluid chamber;
   magnetic sealing means disposed at positions from which the ferromagnetic fluid is squeezed out of the bearing system;
   circulating passages for circulating the ferromagnetic fluid collected between the recovery grooves and the fluid chambers; and
   impelling means disposed within said passages for impelling the ferromagnetic fluid toward said fluid chamber.

2. A hydrostatic bearing system as defined in claim 1, wherein said impelling means comprises means for attracting the ferromagnetic fluid by applying shifting magnetic fields.

3. A hydrostatic bearing system as defined in claim 1, wherein said impelling means comprises at least an impelling pump composed of multilayer rings made of piezo-electric elements.

4. A hydrostatic bearing system as defined in claim 1, wherein said impelling means comprises at least;
   a flexible fluid passage;
   a piezo-electric element for imparting squeezing power to the passage for impelling; and
   means for changing the flow resistance of the fluid disposed at positions upstream and downstream of said impelling means in said flow passage.

5. A hydrostatic bearing system comprising:
   a shaft;
   a hydrostatic bearing fitted around said shaft and provided with at least one fluid chamber at the portion confronting with the shaft for hydrostatically holding ferromagnetic fluid and means for sealing at the both axial sides of the at least one chamber and being relatively movable with each other, characterized in that;
   the hydrostatic bearing further comprises;
   recovery grooves for collecting the ferromagnetic fluid squeezed out from the at least one chamber, a circulating passage connecting the recovery grooves and the chamber, impelling means relating axially to the side portion of the recovery groove for impelling the ferromagnetic fluid, and magnetic sealing means disposed at the portion from where the ferromagnetic fluid squeezes out, the impelling means comprising a flexible membrane to constitute a side wall of the recovery groove, a plurality of impeller ring members concentrically stacked around the shaft and abutted to the outside of the flexible membrane of the recovery groove so as to be actuated axially and reciprocally and a means for changing the flow resistance of the ferromagnetic fluid being located at the connecting end portion of the circulating passage to the recovery groove near the impeller ring.

6. A hydrostatic bearing system as claimed in claim 5, wherein said impeller rings consist of piezo-electric element.

* * * * *